(12) United States Patent
Yamamoto

(10) Patent No.: US 9,097,540 B2
(45) Date of Patent: Aug. 4, 2015

(54) MAP DISPLAY APPARATUS, MAP DISPLAY METHOD, AND MAP DISPLAY PROGRAM PRODUCT

(71) Applicant: JVC KENWOOD Corporation, Yokohama-shi (JP)

(72) Inventor: Shigehiro Yamamoto, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 0 days.

(21) Appl. No.: 13/895,065

(22) Filed: May 15, 2013

(65) Prior Publication Data

US 2013/0249938 A1 Sep. 26, 2013

Related U.S. Application Data

(63) Continuation of application No. PCT/JP2011/078042, filed on Dec. 5, 2011.

(30) Foreign Application Priority Data

Dec. 6, 2010 (JP) .................... 2010-271095

(51) Int. Cl.
G09G 5/00 (2006.01)
G01C 21/26 (2006.01)
G01C 21/36 (2006.01)
G08G 1/0962 (2006.01)

(52) U.S. Cl.
CPC ............ *G01C 21/26* (2013.01); *G01C 21/3658* (2013.01); *G08G 1/09626* (2013.01)

(58) Field of Classification Search
None
See application file for complete search history.

(56) References Cited

U.S. PATENT DOCUMENTS

| 5,553,209 A * | 9/1996 | Johnson et al. ................ 345/667 |
| 6,084,543 A * | 7/2000 | Iizuka ....................... 342/357.31 |
| 6,636,802 B1 | 10/2003 | Nakano et al. |
| 2005/0273256 A1* | 12/2005 | Takahashi ..................... 701/211 |

FOREIGN PATENT DOCUMENTS

| JP | 2001-056823 A | 2/2001 |
| JP | 2001-125702 A | 5/2001 |
| JP | 2005-077346 A | 3/2005 |
| JP | 2010-156800 A | 7/2010 |

OTHER PUBLICATIONS

International Search Report in PCT International Application No. PCT/JP2011/078042 dated Jan. 17, 2012.
Extended European Search Report issued in European Patent Application No. 11846744.8 dated Oct. 16, 2014.

* cited by examiner

*Primary Examiner* — David H Chu
(74) *Attorney, Agent, or Firm* — Venable LLP; Michael A. Sartori; Todd R. Farnsworth

(57) ABSTRACT

A map display apparatus includes: road network information in which integrated traffic signal information is provided in an intersection configured of a plurality of nodes having attribute information of traffic signal available; a display unit which performs map displaying using map image data generated based on the road network information; and a signal displaying controller which performs switching whether a traffic signal icon is displayed at the node of the map image data or the traffic signal icon is displayed at a position to display the integrated traffic signal information according to a display scale of the map displaying.

4 Claims, 11 Drawing Sheets

MAP DISPLAY APPARATUS, MAP DISPLAY METHOD, AND MAP DISPLAY PROGRAM PRODUCT

CROSS-REFERENCE TO RELATED APPLICATIONS(S)

This application is a continuation of International Application No. PCT/JP2011/078042, filed on Dec. 5, 2011 which claims the benefit of priority of the prior Japanese Patent Application No. 2010-271095, filed on Dec. 6, 2010, the entire contents of which are incorporated herein by reference.

BACKGROUND OF THE INVENTION

1. Field of the Invention

The present invention relates to a map display apparatus, a map display method, and a map display program product, which are used for a navigation device and the like.

2. Description of the Related Art

A navigation device which is generally mounted on a vehicle or the like grasps a position of the vehicle using a GPS (Global Positioning System), and guides a route to a destination which is instructed by a user. A typical navigation device performs a displaying of the vehicle position, the guiding of the route, and the like using a map display apparatus mounted in the navigation device. When a request for the map displaying is issued for a region where the navigation device or the like is positioned, the map display apparatus reads out map data on the requested region from a recording unit in which the map data is recorded, generates map image data, and then displays the map image data in a display unit.

A general map data used in the map display apparatus includes detailed city map data in which roads, traffic signals, buildings, and the like are recorded in detail as data, and simply digitized road network information by making intersections as nodes and the straight lines (links) connecting the nodes as roads. The map display apparatus performs the map displaying while appropriately switching a map displaying using the detailed city map data and another map displaying using the road network information. For example, when the detailed city map data is present in a target region of the map displaying, the map display apparatus basically performs the map displaying using the detailed city map data. In this case, however, a display scale of the requested map displaying is a broad display mode of which the scale exceeds an allowable range of the map displaying of the detailed city map data, the map displaying is performed using the road network information instead of the detailed city map data. In addition, since the detailed city map data is provided by only a part of an area of high population density zone but not covers all areas, when the map displaying is applied to an area having no detailed city map data, the map display apparatus performs the map displaying using the road network information. The traffic signal in the map displaying using the road network information is displayed depending on whether a node representing the intersection has attribute information of traffic signal available. In other words, when the node representing the intersection has the attribute information of traffic signal available, a traffic signal icon is displayed at the position of the node.

In this case, however, for the improvement of accuracy in map matching between the subject vehicle position and roads in the road network information, wide roads as illustrated in FIG. 6A are not digitized using one link; for example, as illustrated in FIG. 6B, a plurality (two in FIG. 6B) of links L, each of which is separated into an upper lane and a lower lane, may be digitized.

However, when the above described digitization is being performed, for example, the intersection between the roads digitized into two links L is constituted by four nodes denoted by "◉" in FIG. 6B. When a traffic signal is present in such an intersection, each of the four nodes has the attribute information of traffic signal available, and four traffic signal icons are displayed in one intersection. For this reason, a plurality of traffic signal icons may be densely displayed or may be displayed in an overlapping manner depending on the display scale of the map displaying, and thus it may be difficult to grasp the map displaying. In addition, for example, a user may misunderstand the intersection as a complex intersection, and thus it may be difficult to grasp the traffic signal positions and the road conditions.

In this regard, Japanese Laid-open Patent Publication No. 2001-125702 discloses an invention relating to a display control method in which a representative icon is displayed instead of individual icons when a plurality of icons are displayed in an overlapping manner.

Technical Problem

However, the invention disclosed in Japanese Laid-open Patent Publication No. 2001-125702 relates to icons representing stores, that is, icons of POI (Point of Interest), which is different in a displaying method from that of the traffic signal icon in the road network information. In addition, in the invention disclosed in Japanese Laid-open Patent Publication No. 2001-125702, the representative icon is displayed when the icons are overlapped with each other. However, the traffic signal icon is different from the POI icon, and also includes auxiliary information for helping users to grasp the shape of the intersection. Therefore, when the representative icon is displayed only for the reason that the icons are overlapped, it may rather cause a difficulty in grasping the road conditions.

The present invention has been made in view of the above problems, and an object of the present is to provide a map display apparatus, a map display method, and a map display program product, in which the display mode of the traffic signal icon is switched according to the display scale to make the map displaying more visible.

SUMMARY OF THE INVENTION

It is an object of the present invention to at least partially solve the problems in the conventional technology.

The present invention solves the above problems (1) by providing a map display apparatus 50 that includes: road network information 30b in which integrated traffic signal information is provided in an intersection configured of a plurality of nodes having attribute information of traffic signal available; a display unit 36 which performs map displaying using map image data generated based on the road network information 30b; and a signal displaying controller 38 which performs switching whether a traffic signal icon is displayed at the node of the map image data or the traffic signal icon is displayed at a position to display the integrated traffic signal information according to a display scale of the map displaying.

The present invention solves the above problems (2) by providing a map display method: when a map displaying is performed based on road network information 30b in which integrated traffic signal information is provided in an intersection configured of a plurality of nodes having attribute information of traffic signal available, determining whether a display scale of the map displaying is equal to or higher than a predetermined value; and displaying a traffic signal icon at a position of the integrated traffic signal information to be represented when the display scale of the map displaying does not satisfy the predetermined value and displaying the traffic signal icon at a position of a node having the attribute information of traffic signal available when the display scale of the map displaying is equal to or higher than the predetermined value.

The present invention solves the above problems (3) by providing a map display program product which causes a computer to execute: when a map displaying is performed based on road network information 30b in which integrated traffic signal information is provided in an intersection configured of a plurality of nodes having attribute information of traffic signal available, determining whether a display scale of the map displaying is equal to or higher than a predetermined value; and displaying a traffic signal icon at a position of the integrated traffic signal information to be represented when the display scale of the map displaying does not satisfy the predetermined value and displaying the traffic signal icon at a position of a node having the attribute information of traffic signal available when the display scale of the map displaying is equal to or higher than the predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A map display apparatus, a map display method, and a map display program product according to the present invention will be described with reference to the drawings. Further, the map display apparatus, the map display method, and the map display program product according to the present invention are greatly advantageous in switching the display mode of a traffic signal icon. Therefore, the detailed descriptions about parts having no direct connection to the present invention will not be provided. In addition, a display scale to be described herein will be assumed as follows: when the display scale is set to 1/M, when the M value decreases, the display scale increases and a detailed display mode can be made; and when the M value increases, the display scale decreases and a broad display mode can be made.

Embodiment

Figure 1:
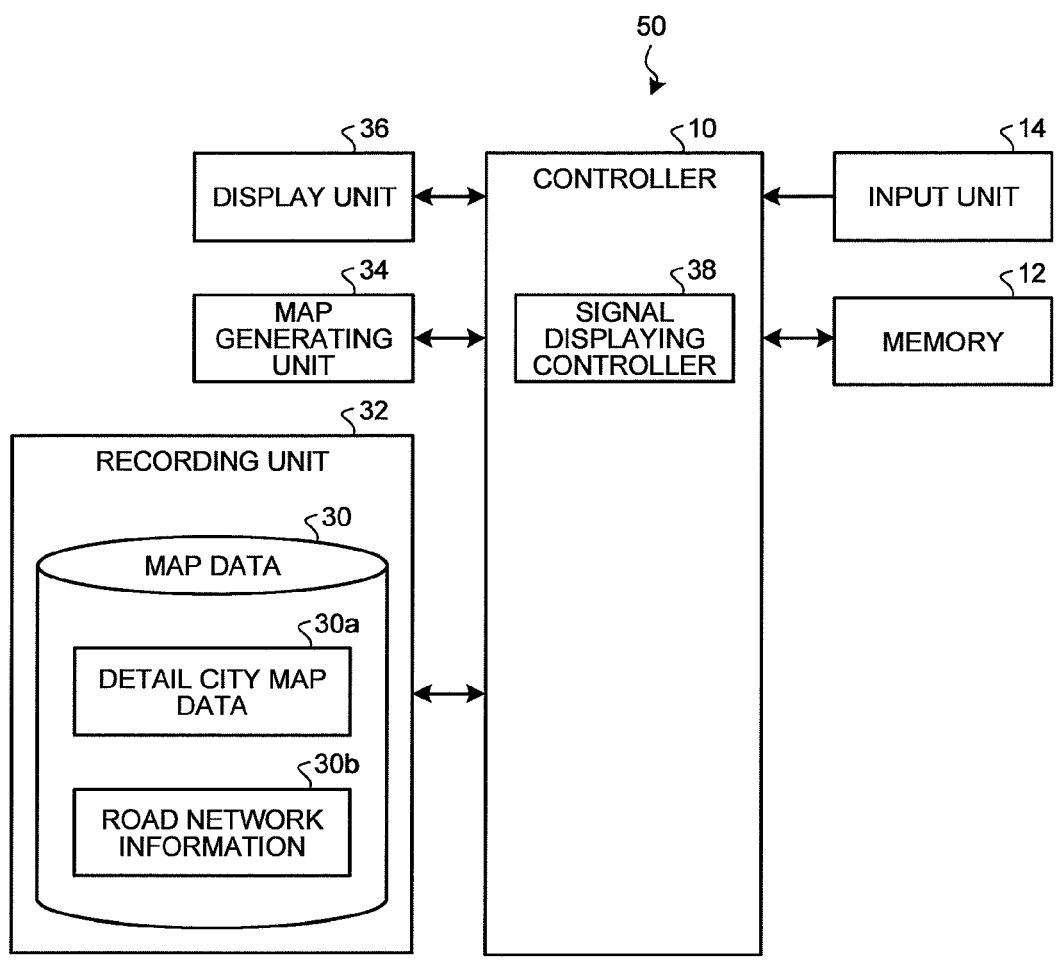
FIG. 1 is a block diagram illustrating a map display apparatus according to the present invention.

A map display apparatus 50 illustrated in FIG. 1 according to the present invention includes: map data 30 which includes detailed city map data 30a and road network information 30b; a recording unit 32 in which the map data 30 is recorded; a map generating unit 34 which generates map image data based on the map data 30; a display unit 36 which performs a map displaying and the like using the map image data; a controller 10 which performs controls and various calculations for the respective components of the map display apparatus 50; a signal displaying controller 38 which switches the display mode of a traffic signal icon according to the display scale for the map displaying; a memory 12 which is used for various calculations by the controller 10 and the signal displaying controller 38; and an input unit 14 through which a user operates the map display apparatus 50. Further, the signal displaying controller 38 may be configured as a part of the controller 10. In addition, when the map display apparatus 50 is mounted on a navigation device, the controller 10, the memory 12, the input unit 14 and the like may be commonly used by the navigation device.

The recording unit 32 may include a known recording device which employs an optical recording medium such as a DVD (Digital Versatile Disc), a hard disk, and a non-volatile memory and the like. In addition, the display unit 36 may include a known displaying apparatus which employs a color liquid crystal, an organic EL display, or the like. In addition, the input unit 14 may include a known input apparatus which employs a touch panel, a voice input apparatus, a button input apparatus, and the like.

Figure 2A:
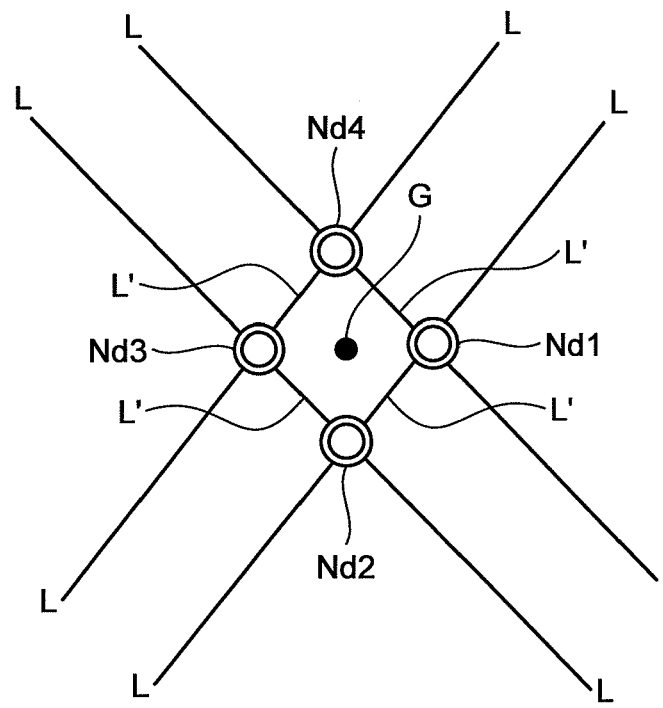
FIG. 2A is a diagram illustrating a display example of a traffic signal icon according to the present invention.

Next, the road network information 30b which is used by the map display apparatus 50 will be described. First, as illustrated in FIG. 2A, an intersection between two roads may be considered, where each one of the roads is digitized using two links L. In this case, the intersection is configured to include four nodes Nd1 to Nd4 and intra-intersection links L' which connect these nodes Nd1 to Nd4. Herein, the intra-intersection links L' are links which connect nodes constituting the same intersection, to which attribute information different from that of the link L indicating the road is assigned. When a traffic signal is present in the intersection, all the nodes Nd1 to Nd4 constituting the intersection have the attribute information of traffic signal available. For this reason, nodes having the attribute information of traffic signal available are present on both ends of the intra-intersection link L'. The road network information 30*b* according to the present invention has the attribute information of traffic signal available, and includes integrated traffic signal information in the intersection configured by a plurality of nodes.

Herein, an example of a method of extracting an intersection which is configured by the plurality of nodes having the traffic signal and a method of assigning the integrated traffic signal information will be described. First, a link of which the nodes at both ends have the attribute information of traffic signal available is extracted. Then, the attribute information of the extracted link is examined. When the examined attribute information is the attribute information of the intra-intersection link L', other intra-intersection links L' which constitute the same intersection are extracted by tracing the intra-intersection link L'. Further, all nodes which have the traffic signals Nd1 to Nd4 and connected to these intra-intersection links L' are extracted. Then, for example, the coordinates of the position G (denoted by "•" in FIG. 2A) of a substantial gravity center is obtained based on the coordinates of the extracted nodes Nd1 to Nd4, and the integrated traffic signal information is assigned to the coordinates to display the traffic signal icon at the time of integration.

Further, depending on the road network information 30*b*, there may be a case where a link is substantially the intra-intersection link but having no attribute information of the intra-intersection link. In this case, it is determined whether or not a plurality of nodes having the attribute information of traffic signal available are present in the same intersection, for example, based on the widths of the intersecting roads (the widths of the roads are analogized based on the lengths of the links and the number of links). Then, the integrated traffic signal information is assigned.

Figure 3:
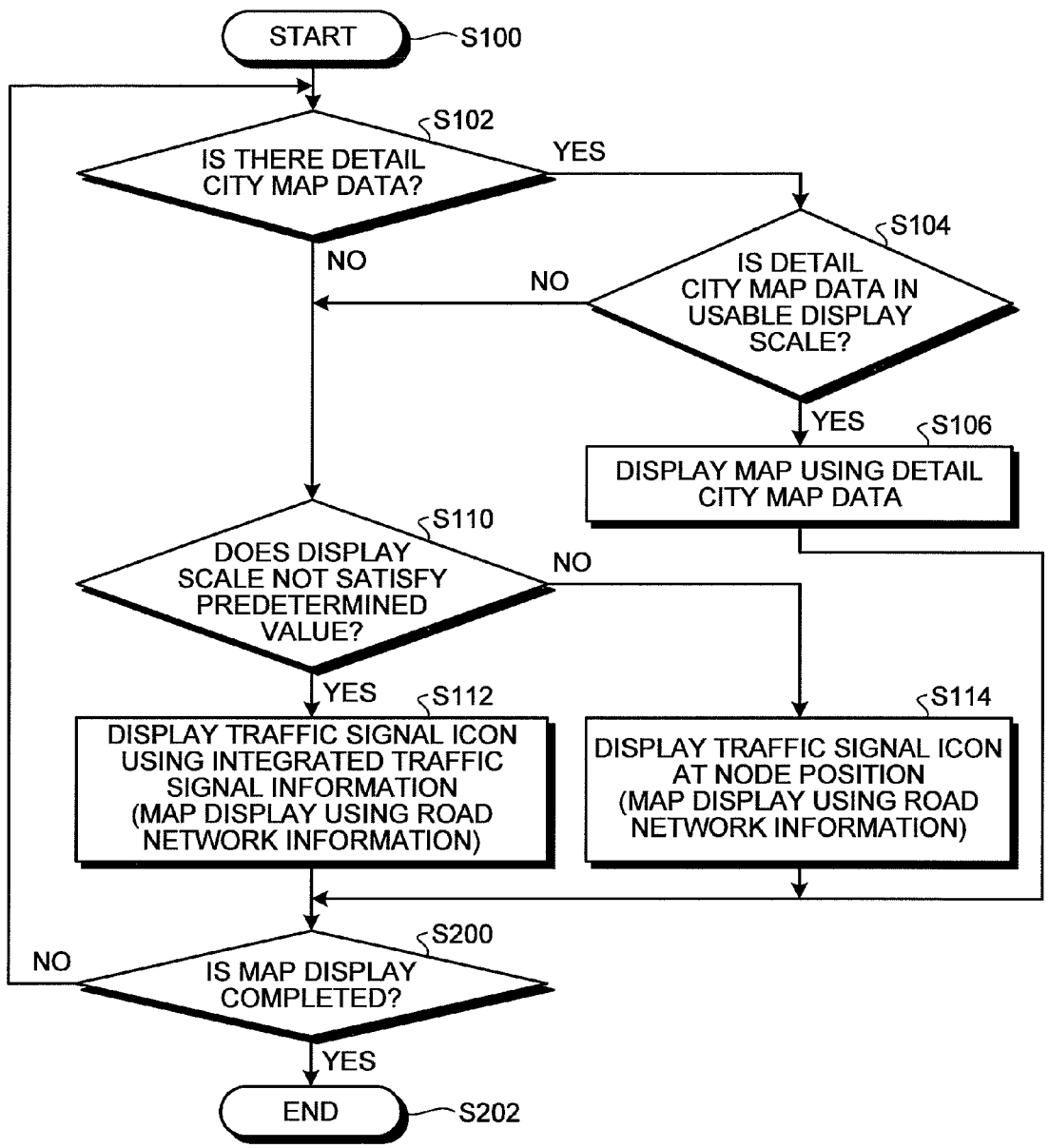
FIG. 3 is a flowchart illustrating a map display apparatus, a map display method, and a map display program product according to the present invention.

Next, the map display apparatus 50, the map display method, and the map display program product according to the present invention will be described using a flowchart of FIG. 3.

First, when the map displaying is requested by an operation through the input unit 14, a map display flow starts (step S100). When the map display flow starts, the controller 10 determines whether or not the detailed city map data 30*a* in a region requested for the map displaying is present in the map data 30 (step S102). Then, when the detailed city map data 30*a* is not present (No in step S102), the process proceeds to step S110. In addition, when the detailed city map data 30*a* is present (Yes in step S102), the controller 10 determines whether or not the display scale of the requested map displaying is possible to make a map displaying using the detailed city map data 30*a* (step S104). Then, when it is determined that the display scale is the broad display mode, which cannot make the map displaying using the detailed city map data 30*a* (No in step S104), the process proceeds to step S110. In addition, when it is determined that the display scale is possible to make the map displaying using the detailed city map data 30*a* (Yes in step S104), the controller 10 causes the map generating unit 34 to create map image data based on the detailed city map data 30*a*, and causes the display unit 36 to make the map displaying based on the detailed city map data 30*a* (step S106). In this case, the traffic signal is displayed based on the detailed city map data 30*a* as in the past. Then, the process proceeds to step S200.

When it is determined that the detailed city map data 30*a* is not present in step S102 (No in step S102) and when determined that the display scale is not possible to make the map displaying using the detailed city map data 30*a* in step S104 (No in step S104), the signal displaying controller 38 determines whether or not the display scale of the map displaying is equal to or higher than a predetermined value (step S110). At this time, the value of the display scale may be set to a specific fixed value, or may be differently set depending on the integrated traffic signal information to be described below.

When it is determined that the display scale of the map displaying is the broad display mode not satisfying the predetermined value (Yes in step S110), the signal displaying controller 38 switches the display mode of the traffic signal icon to display the traffic signal icon at a position of the integrated traffic signal information to be represented. In the intersection where the integrated traffic signal information is present, when creating the map image data base on the road network information 30*b*, the map generating unit 34 draws the traffic signal icon on the intersection not at the positions of the nodes having the traffic signals but at the position of the integrated traffic signal information to be represented. Then, the display unit 36 performs the map displaying at the position of the integrated traffic signal information to be represented, based on the road network information 30*b* in which the traffic signal icon is displayed (step S112). Further, for the intersection in which the integrated traffic signal information is not present, the traffic signal icons are displayed at the positions of the nodes having the traffic signals.

Figure 2B:
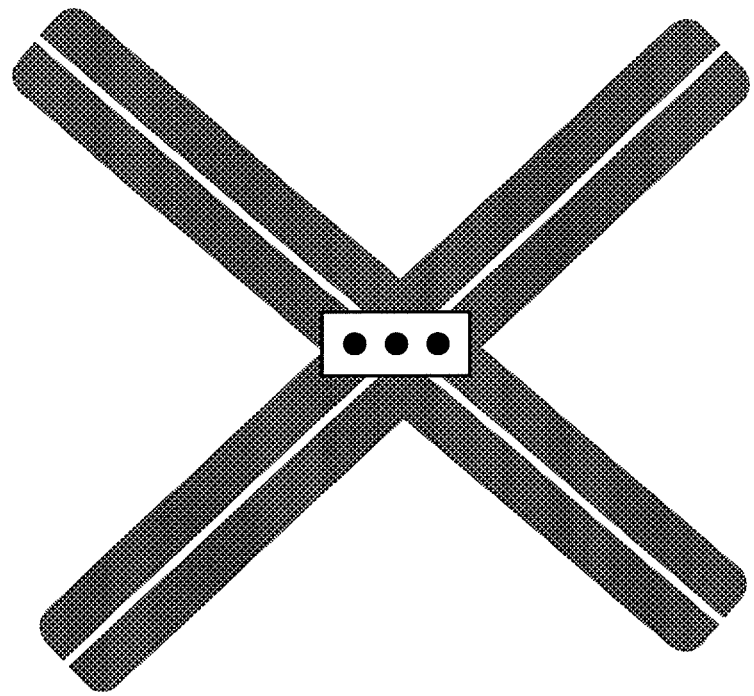
FIG. 2B is a diagram illustrating a display example of the traffic signal icon according to the present invention.
Figure 2C:
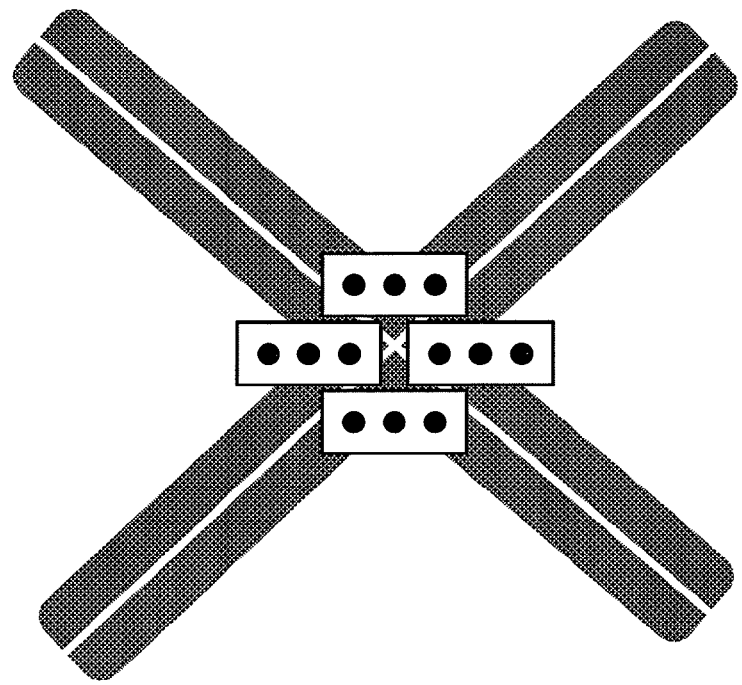
FIG. 2C is a diagram illustrating a display example of the traffic signal icon according to the present invention.

For example, when the map displaying by step S112 is performed at the intersection illustrated in FIG. 2A; as illustrated in FIG. 2B, a traffic signal icon is displayed at the position G of the integrated traffic signal information. With this configuration, the map displaying becomes more visible than that illustrated in FIG. 2C in which the traffic signal icons are displayed at all nodes Nd1 to Nd4 having the traffic signals. Therefore, it is possible to easily grasp the traffic signal positions and the road conditions.

In addition, in a case of a detailed display mode in which the display scale of the map displaying is equal to or higher than a predetermined display scale (No in step S110), the signal displaying controller 38 switches the display mode of the traffic signal icon to display the traffic signal icons at the positions of the nodes having the traffic signals regardless of the integrated traffic signal information. In this case, when creating the map image data based on the road network information 30*b*, the map generating unit 34 draws the traffic signal icons at the positions of the nodes having the traffic signals. Then, the display unit 36 performs the map displaying based on the road network information 30*b* in which the traffic signal icons are displayed at the positions of the nodes having the traffic signals (step S114).

Figure 2D:
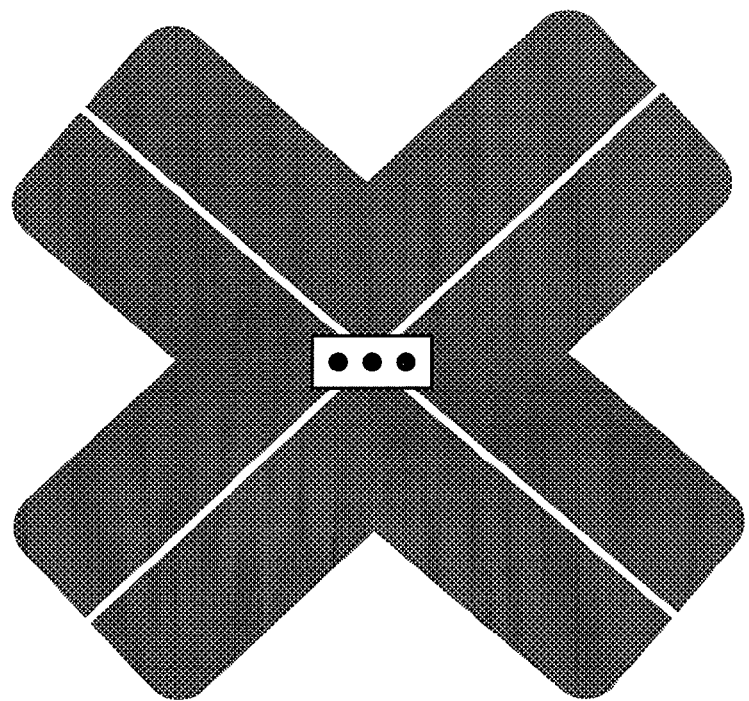
FIG. 2D is a diagram illustrating a display example of the traffic signal icon according to the present invention.
Figure 2E:
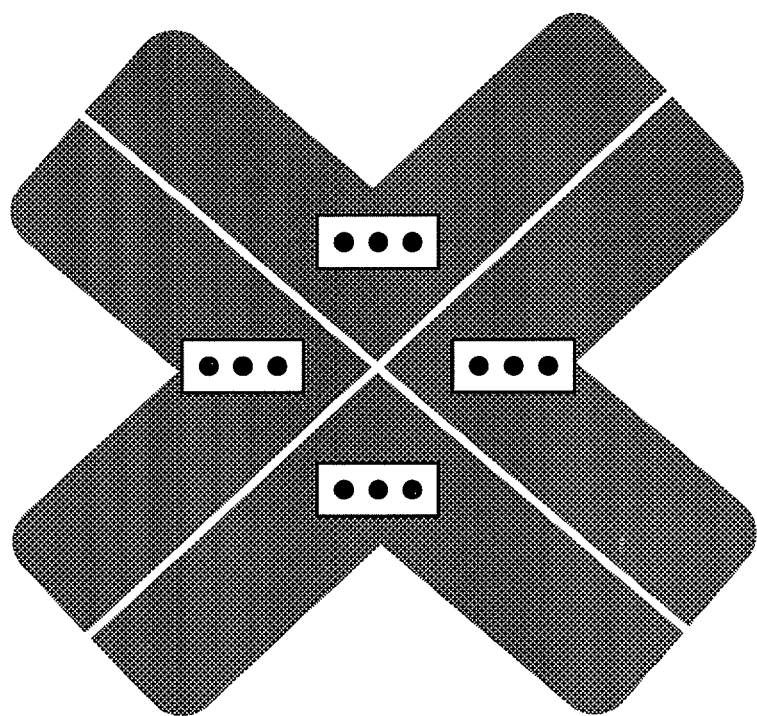
FIG. 2E is a diagram illustrating a display example of the traffic signal icon according to the present invention.

When the traffic signal icon is displayed only at the position G of the integrated traffic signal information to be represented in the detailed display mode having a large display scale corresponding to step S114, a sense of discomfort may occur as illustrated in FIG. 2D, and thus it may be difficult to grasp the traffic signal positions and the road conditions. Therefore, in a case of the detailed display mode having the predetermined display scale or higher, as illustrated in FIG. 2E, the traffic signal icons are displayed at all nodes Nd1 to Nd4 having the attribute information of traffic signal available. With this configuration, even in a case of the detailed display mode, it is possible to more easily grasp the traffic signal positions and the road conditions.

Further, when the display position of the traffic signal icon is overlapped with a highway, the traffic signal icon may not be displayed or may be displayed by a translucent color, for example, in order to prevent the traffic signal icon from being displayed as if the traffic signal is present on the highway.

After the map displaying is performed in accordance with the above-mentioned flow, when there is a request for ending the map displaying (Yes in step S200), the map display flow is ended (step S202) and the process proceeds to the next operation. In addition, when there is no request for ending the map displaying (No in step S200), the above-mentioned map display flow is repeated until the end request of the map displaying is issued.

Further, the map display program product according to the present invention is particularly featured in that, as described above, the display scale of the map displaying is determined to cause a computer (the signal displaying controller 38) to execute a process of switching whether the traffic signal icons are displayed at the positions of the nodes having the traffic signals or the traffic signal icon is displayed at the position of the integrated traffic signal information to be represented.

In addition, as described above, the display scale used to switch the display mode of the traffic signal icon may be fixed to a display scale such that the traffic signal position is appropriately grasped in both the broad display mode and the detailed display mode. Alternatively, the display scale may be differently set depending on the integrated traffic signal information. When the display scale used to switch the display mode is set to a fixed value, the map display apparatus 50 is alleviated in load and thus performs the map displaying in a rapid manner. In addition, when the display scale is differently set depending on the integrated traffic signal information, it is possible to display the traffic signal icons more visible according to the conditions of the respective intersections.

Figure 4A:
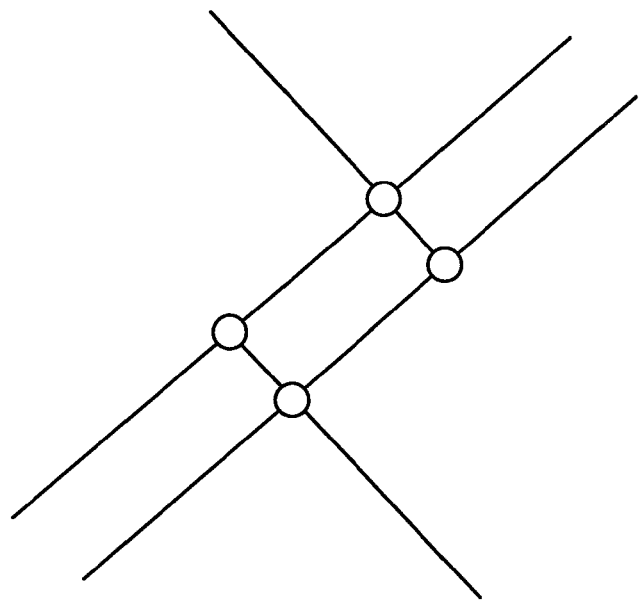
FIG. 4A is a diagram illustrating a display example of the traffic signal icon according to the present invention.
Figure 4B:
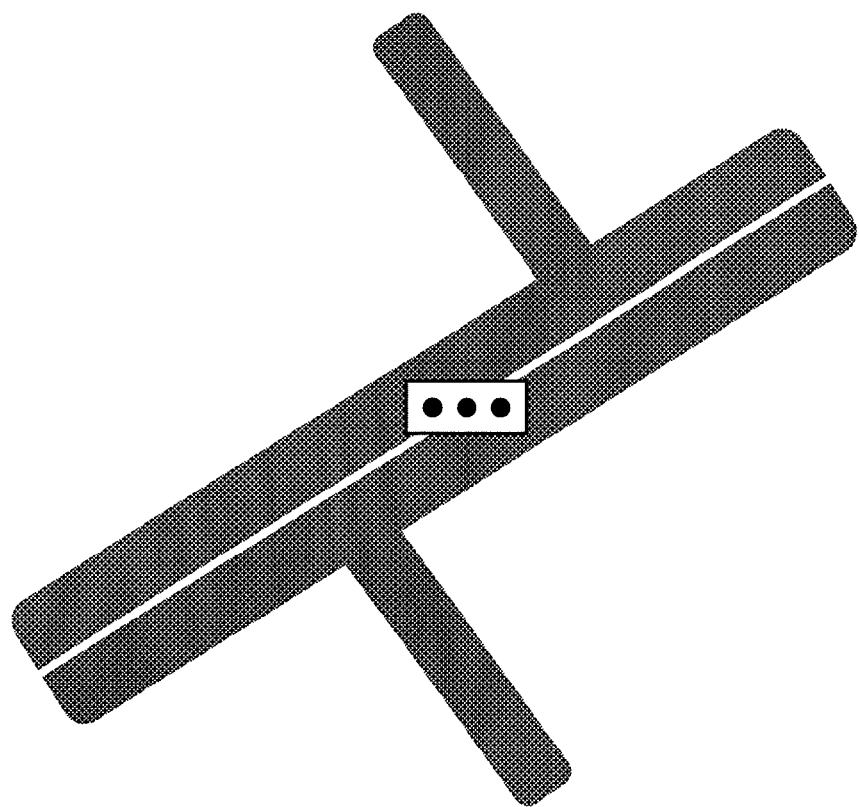
FIG. 4B is a diagram illustrating a display example of the traffic signal icon according to the present invention.
Figure 4C:
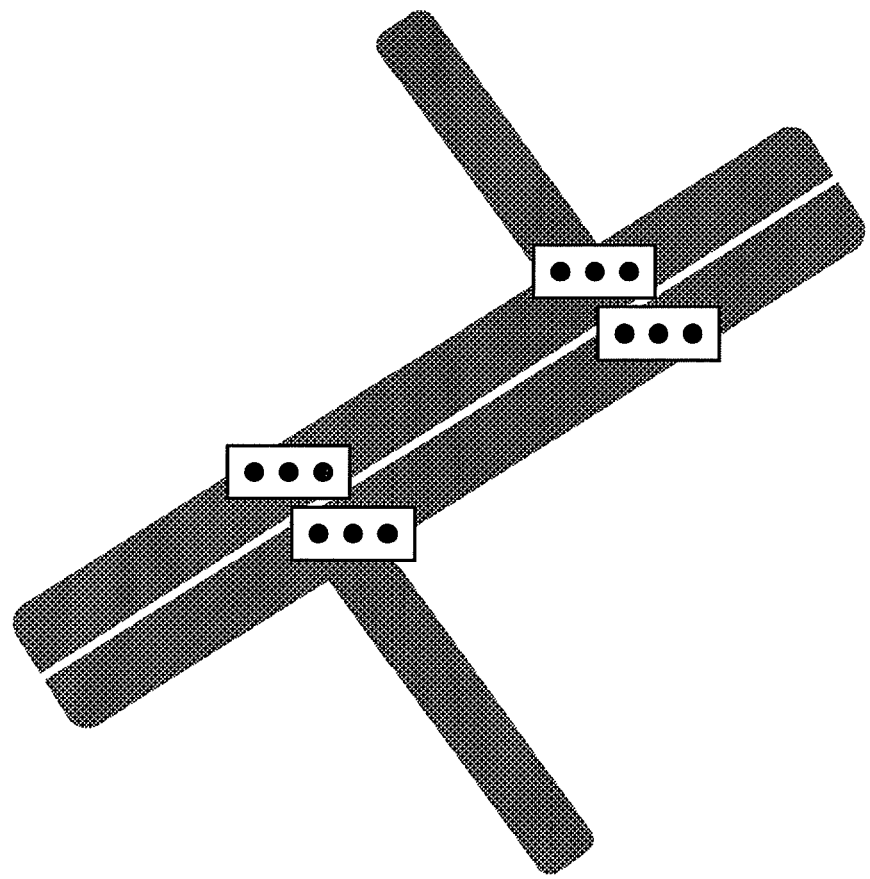
FIG. 4C is a diagram illustrating a display example of the traffic signal icon according to the present invention.

Herein, examples of setting the display scales when the different display scales are used depending on the integrated traffic signal information will be described. In a first setting example of the display scale used to switch the display mode, the display scale is set according to the length of the intra-intersection link. For example, as illustrated in FIG. 4A, when there is an intra-intersection link having a relatively long distance in the same intersection, when the traffic signal icon is displayed in the detailed display mode based on the integrated traffic signal information as illustrated in FIG. 4B, it is difficult to grasp the traffic signal position and the road conditions. Therefore, in a case of the intersection in which there is the intra-intersection link having a relatively long distance, the display scale used to switch the display of the traffic signal is set to be relatively low such that the traffic signal icons are displayed at the nodes illustrated in FIG. 4C from at a some level of the broad display mode.

Figure 4D:
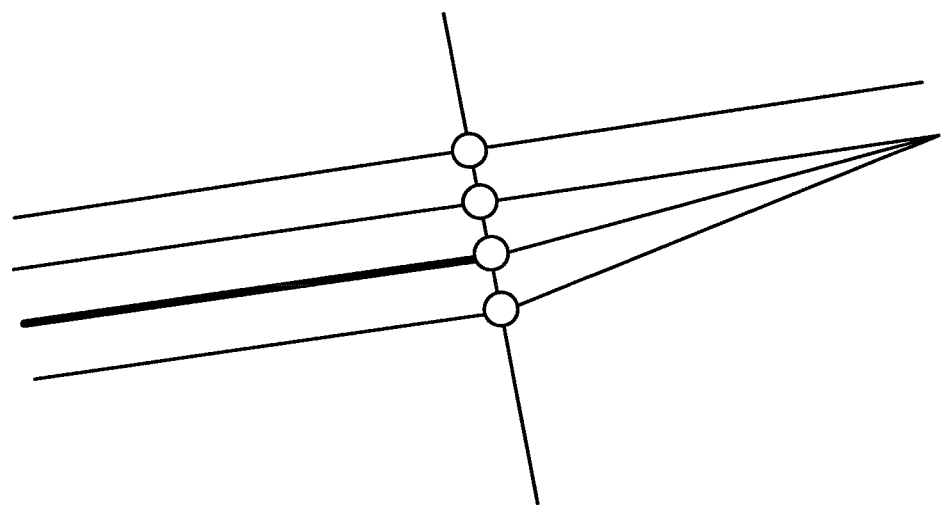
FIG. 4D is a diagram illustrating a display example of the traffic signal icon according to the present invention.
Figure 4E:
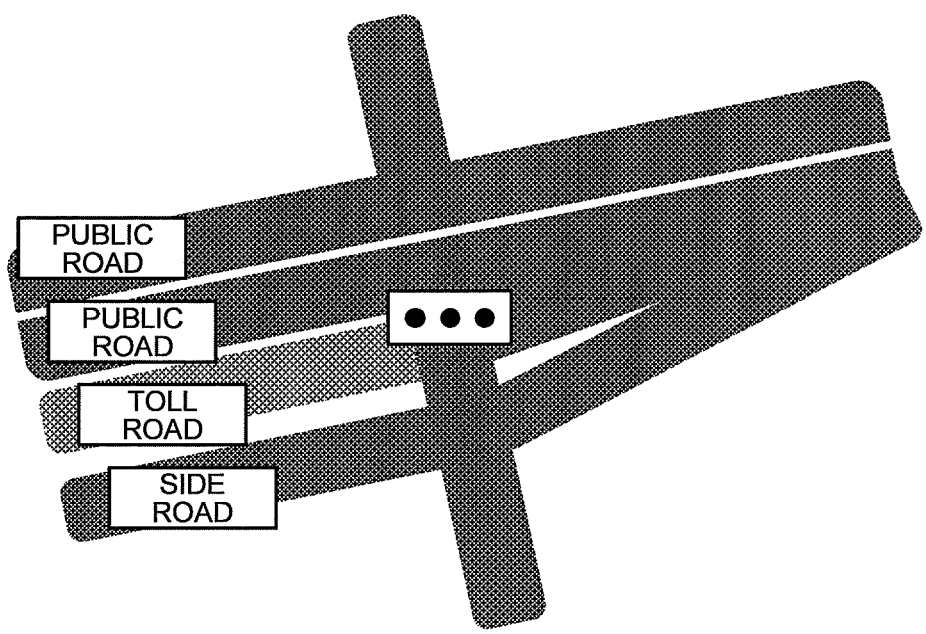
FIG. 4E is a diagram illustrating a display example of the traffic signal icon according to the present invention.
Figure 4F:
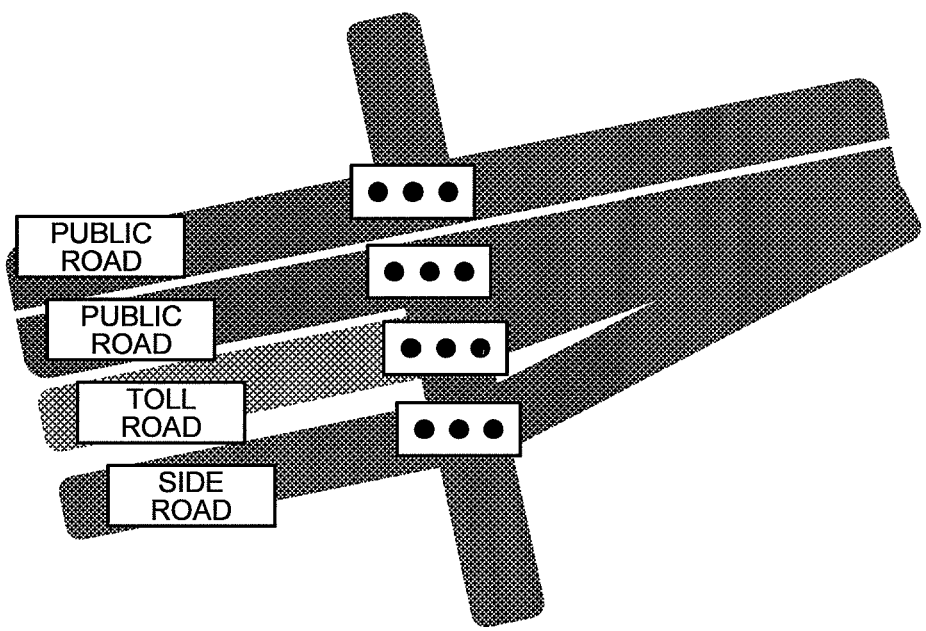
FIG. 4F is a diagram illustrating a display example of the traffic signal icon according to the present invention.

In a second setting example of the display scale used to switch the display mode, the display scale is set according to the size of the intersection. For example, as illustrated in FIG. 4D, when an intersection of roads is very complicatedly configured by four lines, the length of the intra-intersection link is short but the intersection itself is long and large. As illustrated in FIG. 4E, if the traffic signal icon is displayed in the detailed display mode based on the integrated traffic signal information, it is difficult to grasp the traffic signal position and the road conditions. Therefore, in a relatively large intersection, the display scale used to switch the display of the traffic signal is set to be relatively low such that the traffic signal icons are displayed at the nodes illustrated in FIG. 4F from a relatively broader display mode.

Figure 5A:
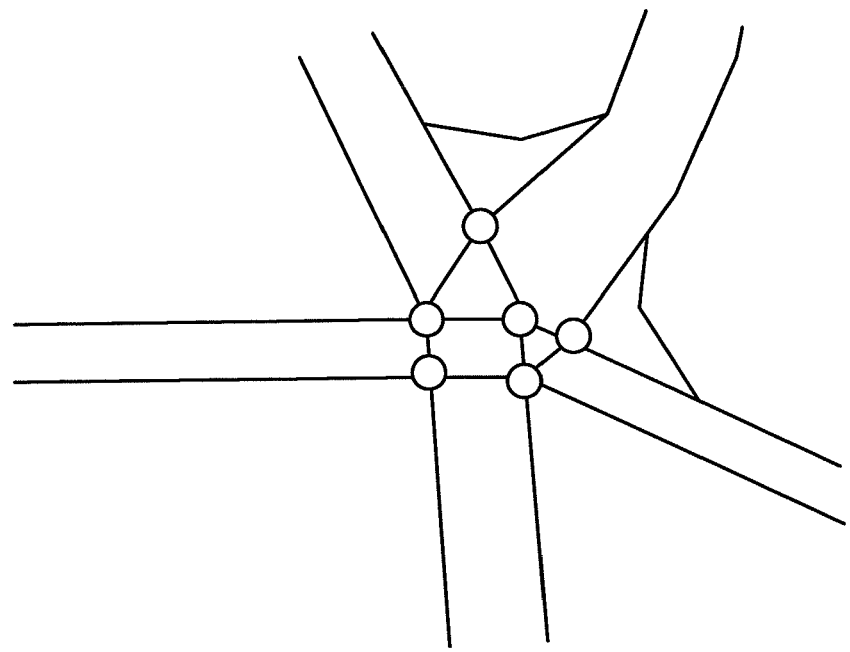
FIG. 5A is a diagram illustrating a display example of the traffic signal icon according to the present invention.
Figure 5B:
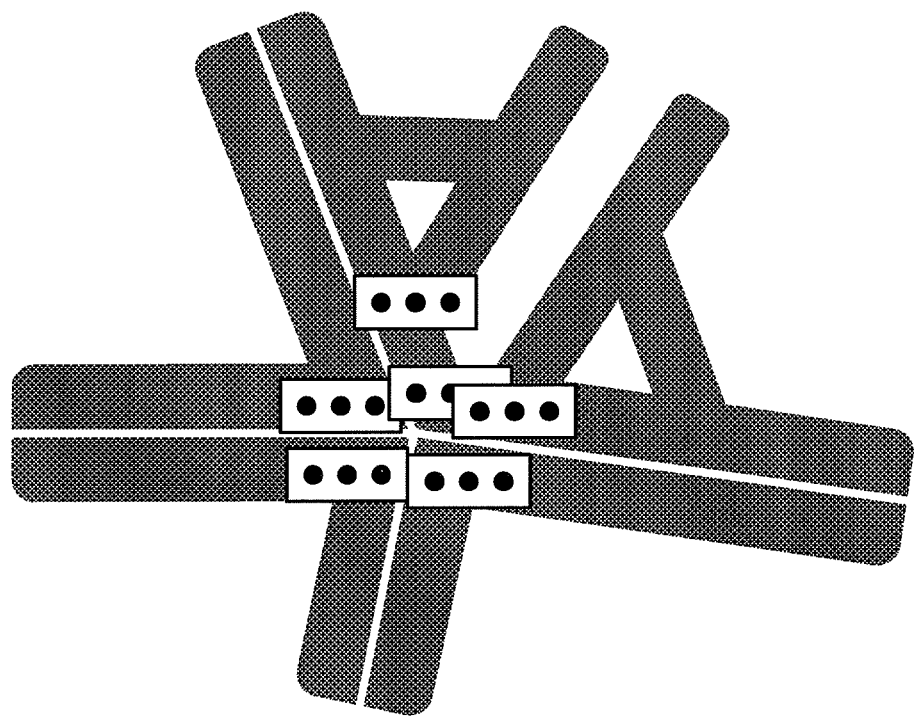
FIG. 5B is a diagram illustrating a display example of the traffic signal icon according to the present invention.
Figure 5C:
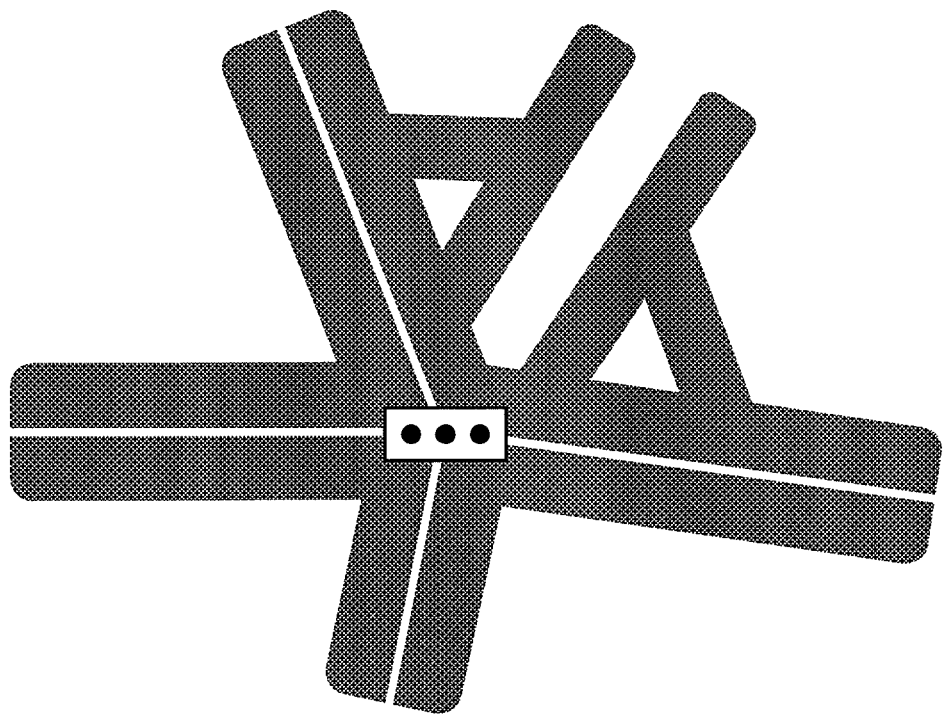
FIG. 5C is a diagram illustrating a display example of the traffic signal icon according to the present invention.
Figure 6A:
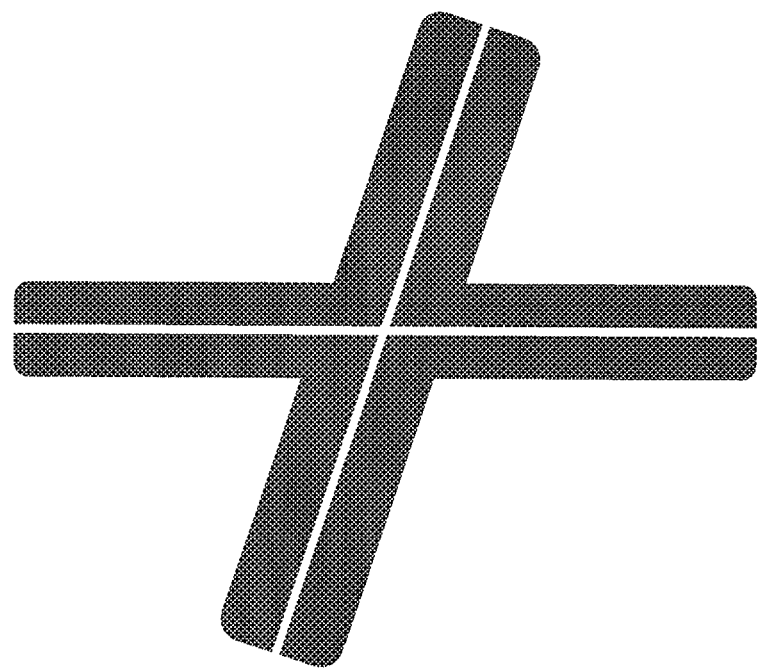
FIG. 6A is a diagram illustrating road network information.
Figure 6B:
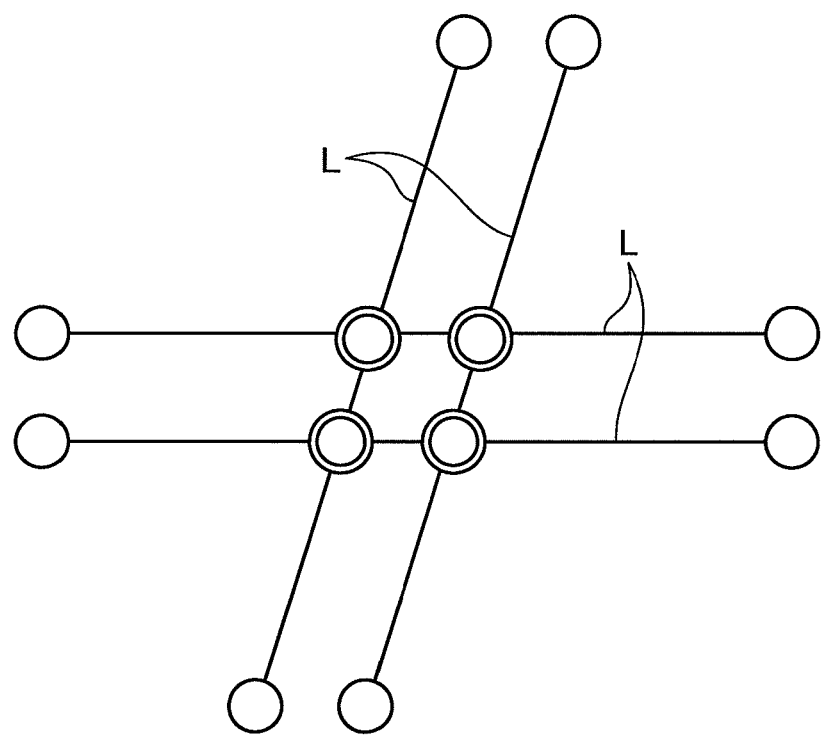
FIG. 6B is a diagram illustrating the road network information.

In a third setting example of the display scale used to switch the display mode, the display scale is set according to the number of nodes having the traffic signals which are present in the same intersection. For example, when there are nodes having a number of traffic signals in the same intersection as illustrated in FIG. 5A, when the display mode is a mode of displaying the traffic signal icon at each node, it is difficult to understand the map displaying as illustrated in FIG. 5B even though the display scale is for relatively detail displaying. Therefore, in a case of the intersection in which there are the nodes having a number of traffic signals, the display scale used to switch the display of the traffic signal is set to be relatively high such that the traffic signal icon is displayed based on the integrated traffic signal information illustrated in FIG. 5C up to a much higher level of the display scale. The third setting example is described above. Further, the above-mentioned first to third setting examples may be appropriately combined. In addition, depending on the conditions of the intersection, the display scale of switching the display of the traffic signal may be set to a maximum display scale so that the traffic signal icon is always displayed based on the integrated traffic signal information.

Further, when the display scale used to switch the display of the traffic signal is differently set for each piece of the integrated traffic signal information, the signal displaying controller 38 may perform the determination each time on the display scale used to switch the display of the traffic signal. Alternatively, the signal displaying controller 38 may perform the switching of the display mode as follows: once the display scale information used to switch the display of the traffic signal is recorded in a part of the integrated traffic signal information in advance, the signal displaying controller 38 reads out the display scale information of the integrated traffic signal information for the comparison with the display scale of the map displaying. Further, a plural pieces of the integrated traffic signal information having different values of the display scale information may be set in the same intersection, and the number of traffic signal icons to be displayed may increase in stages depending on the display scale of the map displaying.

As described above, according to the map display apparatus 50, the map display method, and the map display program product described in the present invention, the display mode in which the traffic signal icon is displayed at the position of the node having the traffic signal and the display mode in which the traffic signal icon is displayed at the position of the integrated traffic signal information to be represented are switched according to the display scale of the map displaying. With this configuration, in a case of the broad display mode, one traffic signal icon is displayed in the same intersection; in a case of the detailed display mode, a traffic signal icon is displayed at each one of the positions of the nodes having the traffic signals. Thus, it is possible to perform the map displaying through which the traffic signal positions and the road conditions are easily grasped in both the broad display mode and the detailed display mode.

Further, the present invention includes program products which cause a computer to realize the functions of the map display apparatus 50. These program products may be read from another recording medium and installed in the computer, and alternatively may be transmitted through a communication network and installed in the computer.

In addition, since the map display apparatus 50, the map display method, and the map display program products described above are merely examples. Therefore, operations, structures, procedures, and the like of the respective components are not limited thereto, and the present invention can be changed and implemented in a scope not departing from the spirit of the present invention.

According to the present invention, it is possible to make a map displaying more visible by switching a display mode of a traffic signal icon according to the display scale. Therefore, the traffic signal positions and the road conditions can be easily grasped.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A map display apparatus comprising:
    road network information in which integrated traffic signal information is provided in an intersection configured of a plurality of nodes having attribute information of traffic signal available;
    a display unit which performs map displaying using map image data generated based on the road network information; and
    a signal displaying controller which performs switching whether a traffic signal icon is displayed at a node of the map image data or the traffic signal icon is displayed at a position to display the integrated traffic signal information according to a display scale of the map displaying,
    wherein the signal displaying controller displays the traffic signal icon at the node of the map image data when the display scale is equal to or higher than a first predetermined value, and displays the traffic signal icon at the position to display the integrated traffic signal information when the display scale is lower than the first predetermined value,
    the signal displaying controller changes the first predetermined value in accordance with at least one of a distance of an intra-intersection link in the intersection, a number of lines in the intersection, or a number of the traffic signals in the intersection, the distance of the intra-intersection link and the number of lines in the intersection that are included in the map image data, and
    the signal displaying controller sets the first predetermined value to be relatively low such that the traffic signal icon is displayed at the node of the map image data when the distance of the intra-intersection link is longer than a second predetermined value, or the number of the lines is bigger than a third predetermined value.

2. A map display method comprising:
    when a map displaying on a display unit is performed using map image data generated based on road network information in which integrated traffic signal information is provided in an intersection configured of a plurality of nodes having attribute information of traffic signal available,
    determining whether a display scale of the map displaying is equal to or higher than a first predetermined value;
    displaying a traffic signal icon at a node of the map displaying when the display scale is equal to or higher than the first predetermined value;
    displaying a traffic signal icon at a position of the integrated traffic signal information to be represented when the display scale is lower than the predetermined value;
    changing the first predetermined value in accordance with at least one of a distance of an intra-intersection link in the intersection, a number of lines in the intersection, or a number of the traffic signals in the intersection, the distance of the intra-intersection link and the number of lines in the intersection that are included in the map image data, and
    setting the first predetermined value to be relatively low such that the traffic signal icon is displayed at the node of the map image data when the distance of the intra-intersection link is longer than a second predetermined value, or the number of the lines is bigger than a third predetermined value.

3. A non-transitory computer readable media having stored thereon a computer program product that is executed by the computer for: when a map displaying is performed using map image data generated based on road network information in which integrated traffic signal information is provided in an intersection configured of a plurality of nodes having attribute information of traffic signal available,
    determining whether a display scale of the map displaying is equal to or higher than a predetermined first value;
    displaying a traffic signal icon at a node of the map displaying when the display scale is equal to or higher than the first predetermined value;
    displaying a traffic signal icon at a position of the integrated traffic signal information to be represented when the display scale is lower than the predetermined value;
    changing the first predetermined value in accordance with at least one of a distance of an intra-intersection link in the intersection, a number of lines in the intersection, or a number of the traffic signals in the intersection, the distance of the intra-intersection link and the number of lines in the intersection that are included in the map image data, and
    setting the first predetermined value to be relatively low such that the traffic signal icon is displayed at the node of the map image data when the distance of the intra-intersection link is longer than a second predetermined value, or the number of the lines is bigger than a third predetermined value.

4. The map display apparatus according to claim 1, wherein the signal displaying controller sets the first predetermined value to be relatively high such that the traffic signal icon is displayed at the position to display the integrated traffic signal information when the number of the traffic signals is bigger than a fourth predetermined value.

* * * * *